Figure 1:
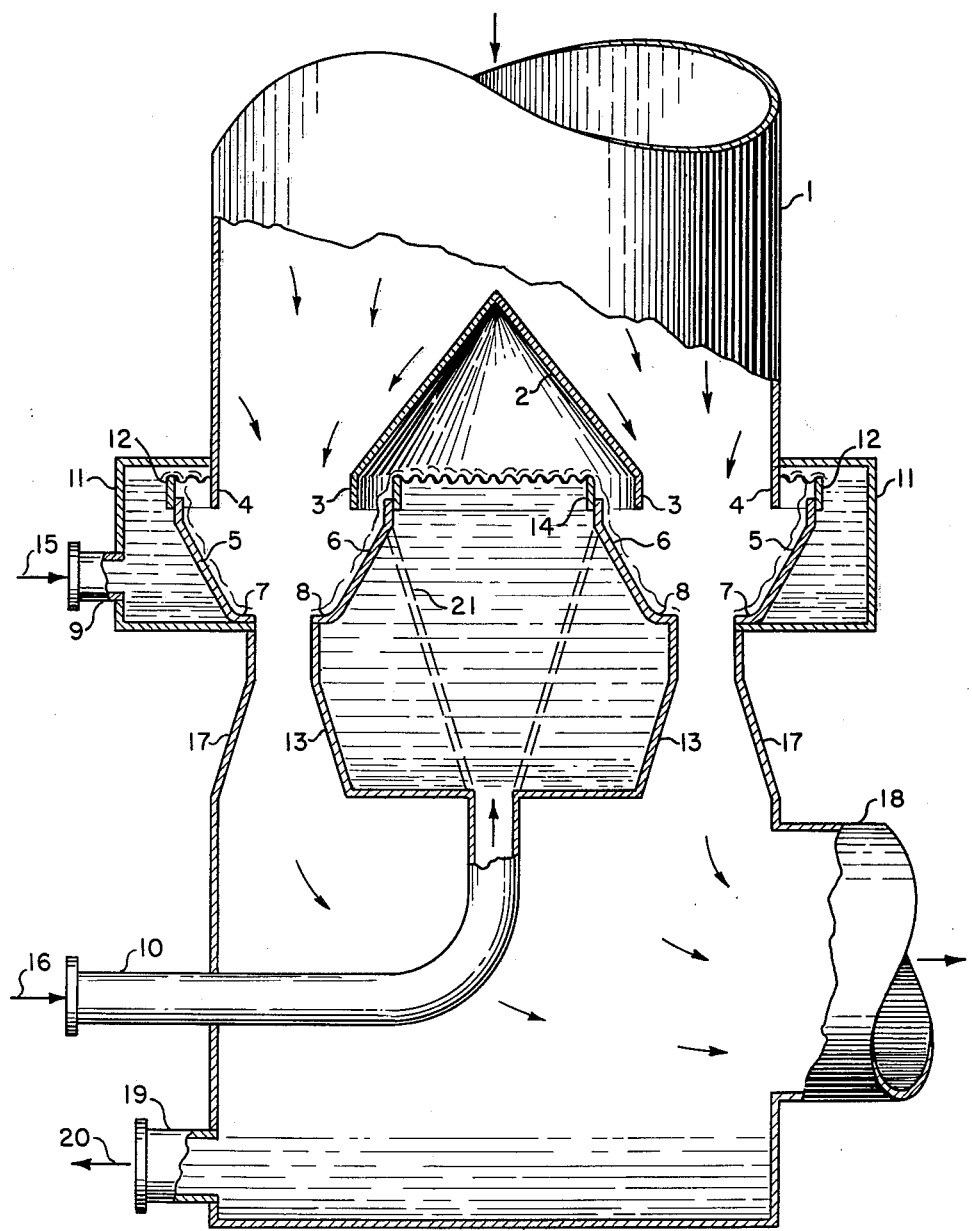

DANIEL E. PIKE
ARTHUR F. STONE
INVENTORS

DANIEL E. PIKE
ARTHUR F. STONE
INVENTORS

BY J. T. Chaloty
AGENT

United States Patent Office 3,085,793
Patented Apr. 16, 1963

3,085,793
APPARATUS FOR SCRUBBING SOLIDS FROM GAS STREAMS
Daniel E. Pike and Arthur F. Stone, Emerson, N.J., assignors to Chemical Construction Corporation, New York, N.Y., a corporation of Delaware
Filed Oct. 26, 1960, Ser. No. 65,167
3 Claims. (Cl. 261—112)

This invention relates to the removal of entrained solids from gas streams. An apparatus has been devised which accomplishes efficient removal of solids from large volumes of gas in an improved and more effective manner.

Numerous devices and various types of apparatus have been employed to remove entrained solids and fumes from gas streams. These various types of apparatus may be separated into wet and dry groups. Wet types of apparatus, such as Venturi scrubbers, packed towers, spray towers, etc., depend on wetting the solid particles or entrainment in the liquid phase as a principal mode of action. Dry types such as electrostatic percipitators, bag filters, dry cyclones, etc., depend mainly on physical characteristics to remove the solid material from the gas phase. In general, it may be said that dry collectors are employed where the gas volume is relatively large and low pressure drop is required. However, dry collectors, except for the relatively expensive electrostatic precipitator types, are not generally effective when the solid particles are of sub-micron size. The apparatus of the present invention now makes possible the effective and economical wet scrubbing of entrained solids in instances where such particles are present in large volumes of gas.

In the present invention, the solids-laden gas stream is directed vertically downwards in a circular inlet duct. A conical baffle is provided coaxially within the duct, whereby the gas stream is uniformly directed into an annular flow path adjacent to the inner perimeter of the duct. The gas stream then passes downwards between two concentric circular baffles. These baffles are inclined so as to converge in a downwards direction, and are further provided with opposed horizontal projection lips. The scrubbing liquid is passed downwards over the surface of the baffles, and thence is projected horizontally into the gas stream by the lips. At the same time, the gas stream is accelerated due to the constriction of flow path. The resulting gas-liquid contact between the highly accelerated gas stream flowing vertically downwards and the horizontally projected liquid, results in an atomizing or shattering type of dispersal of liquid into the gas stream and highly effective gas scrubbing. Final separation of solids-laden liquid from the scrubbed gas stream is conventional.

A principal advantage of this type of apparatus is that the gas stream is directed into a narrow annulus rather than a circular central passage, prior to the horizontal projection of liquid into the gas stream. Thus, the gas-liquid contact is more effectively extended across the entire gas flow path, as compared to prior Venturi-type operations in which the gas flow is narrowed to a centrally located circular path. Another advantage is that the gas flow is accelerated by the Venturi principle in apparatus which is much more compact, and hence less expensive. This is especially important where the gas velocity in the throat is comparatively low, and large gas volumes are being handled. In such instances, a conventional Venturi-type acceleration by gradual flow path constriction requires a prohibitively lengthy approach section. The apparatus of the present invention obviates the long approach requirement in such instances, since in effect the long approach requirement is eliminated by the annular flow configuration. Thus the apparatus of the present invention may be advantageously applied in numerous circumstances where previous reasonably efficient solids removal has been limited to methods employing electrostatic precipitation systems, which are uniformly high in capital and operating costs.

It is an object of the present invention to provide apparatus for more effective removal of dust, mist and fumes from gas streams.

Another object is to remove entrained solids from gas streams in an improved apparatus using a liquid scrubbing agent.

A further object is to more effectively remove sub-micron solid particles from gas streams by acceleration of the gas stream, using improved apparatus, followed by transverse injection of a liquid scrubbing agent.

An additional object is to provide apparatus which is more compact and less expensive to construct and install, for the removal of entrained solids from gas stream by liquid scrubbing.

Figure 2:
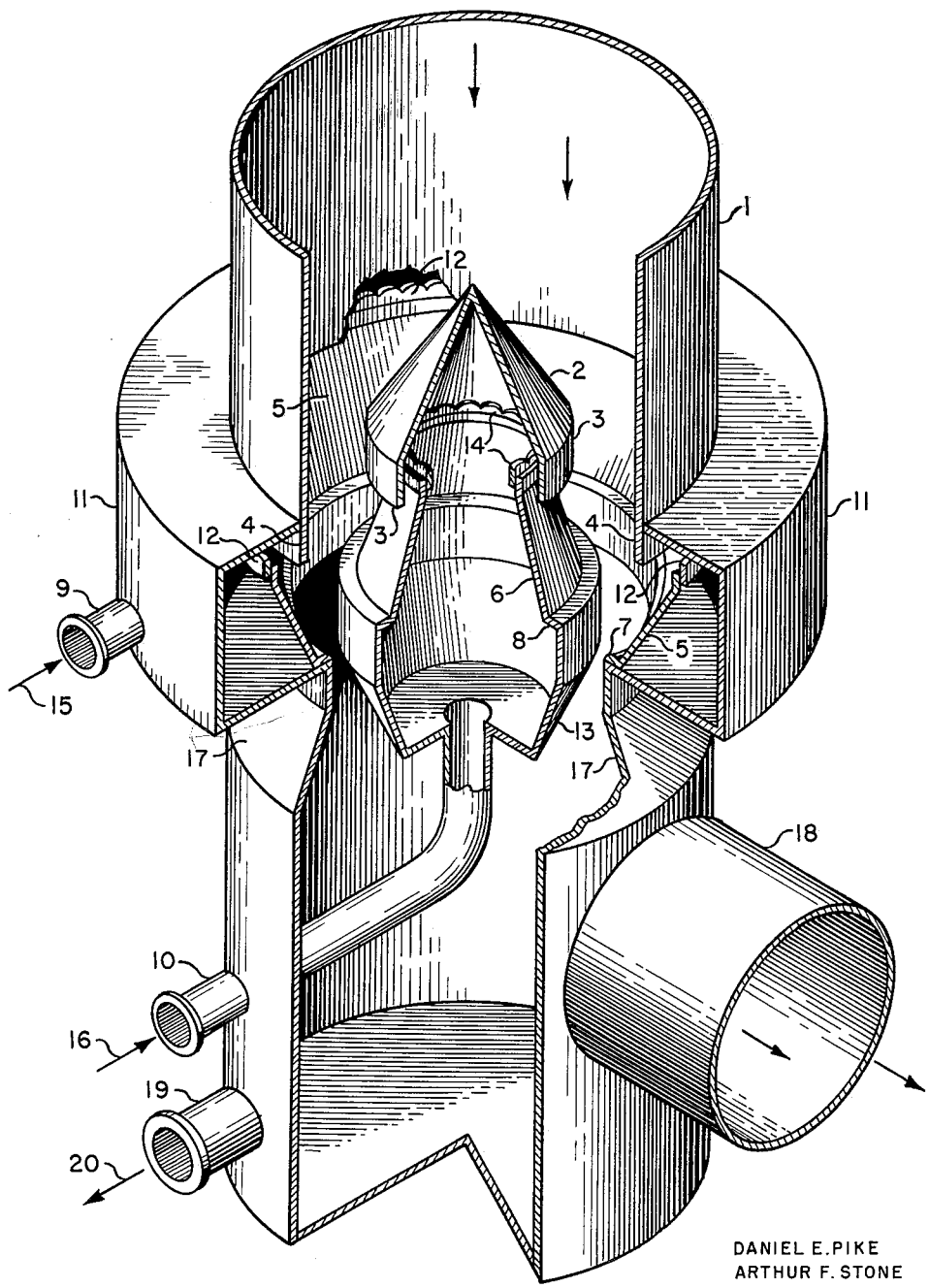

These and other objects and advantages of the present invention will become evident from the description which follows. FIGURE 1 is an elevation view of the apparatus, and FIGURE 2 is an isometric view further illustrating the coaction of the elements in the apparatus of the present invention.

Referring to FIGURE 1, the inflowing solids-laden gas stream enters the unit through the upper circular inlet duct 1. Duct 1 is oriented in a substantially vertical position, so as to insure proper coaction between the gas stream and the scrubbing liquid, as will appear infra. A conical baffle element 2 is coaxially suspended within duct 1 by support means, not shown. Baffle 2 is preferably provided with a further cylindrical lower extension 3, which extends vertically downwards from baffle 2 and serves, together with the lower extremity 4 of duct 1, to define a uniform annular gas flow passage. Thus the gas stream is gradually diverted by baffle 2 to relatively smooth, non-turbulent flow into the annular passage between concentric circular elements 3 and 4.

The annular-flowing gas stream is now greatly accelerated. Gas velocity is increased by constricting the gas flow path using the energy-conserving Venturi principle. Thus, flow constriction baffle elements 5 and 6 are provided, with outer concentric baffle 5 sloping inwards in the downstream direction and inner concentric baffle 6 sloping outwards in the downstream direction. The concentric baffles 5 and 6 are also coaxial with duct 1, so as to maintain the symmetry gas flow with minimum turbulence. Baffles 5 and 6 are further provided with lower substantially horizontal liquid projection lips 7 and 8 respectively.

Scrubbing liquid streams 15 and 16 are introduced into the apparatus by conduits 9 and 10 respectively. Conduit 9 feeds scrubbing liquid stream 15 into the reservoir space defined by fluid enclosure 11 and baffle 5. The liquid stream then passes up over circular notched weir 12, which is attached to the top of baffle 5. Thus liquid stream 15 is uniformly distributed over the inner surface of baffle 5, and flows downward to lip 7 where it is horizontally projected into the highly accelerated downflowing gas stream. Likewise, scrubbing liquid stream 16 passes from conduit 10 into the reservoir space defined by fluid enclosure 13 and baffle 6. This liquid stream then passes up over circular notched weir 14, which is attached to the top of baffle 6. The liquid stream 16 is thus uniformly distributed over the outer surface of baffle 6, and flows downward to lip 8 where it is horizontally projected into the highly accelerated downflowing gas stream and directly opposite to liquid stream 15. Thus liquid streams 15 and 16 converge and meet at this point where the annular gas flow passage is restricted to the maximum degree and provides the greatest gas stream acceleration.

The resultant scrubbing effect involves several types of contact between the liquid phase and the gas phase. Principally, the horizontally flowing liquid phase is shattered into minute droplets, which provide in themselves a scrubbing effect. In addition, solids removal is also accomplished due to direct impaction of the solid components against the liquid phase. The action here does not represent turbulent spraying in the conventional sense, rather, there is a sharp change of physical state involved whereby there is substantially no turning of the liquid phase into a downward direction. Instead, the liquid phase essentially becomes discontinuous and is uniformly dispersed in a fog-like fashion into the gas stream.

The mixed gas-liquid stream next passes to conventional phase separation. Preferably, a gradual enlargement of the flow passage is provided, in the deceleration of the mixed stream, thereby conserving energy. Thus, the mixed gas-liquid stream passes first through a gradual enlargement passage defined by outwardly sloping outer wall 17 and fluid enclosure 13. Following this, conventional gas-liquid phase separation such as gravity settling is employed, with optional entrainment separation, not shown. The final scrubbed gas stream is passed out of the apparatus via outlet duct 18, while scrubbing liquid is retained in the base of the apparatus and removed via conduit 19 and line 20.

In some instances, some or all of liquid stream 20 may be recycled to form part of streams 15 or 16. This optional practice may introduce difficulties in some instances, principally due to the presence of solid particles in liquid stream 20. Thus, if stream 20 is recycled into stream 16, it will usually be necessary to provide a conical partition 21 at the outlet of conduit 10. Since partition 21 is an optional element, it is indicated in dashed lines only. The purpose of partition 21 is to maintain liquid stream velocity, thereby avoiding any solids settling and clogging prior to liquid dispersal over weir 14.

Referring now to FIGURE 2, an isometric view of the apparatus is presented in order to fully and distinctly point out the arrangement and coaction of the various apparatus elements. Thus, the coaxial arrangement of the various circular or conical apparatus elements is readily evident. The coaxial symmetry of the apparatus elements of the present invention serves to provide a smooth transition to the annular flow path, followed by contraction to an annular Venturi, which is a characteristic feature of the apparatus of present invention. Since the view of FIGURE 2 is provided primarily for purposes of full and clear disclosure of the apparatus elements and their coaction in the unitary apparatus combination of the present invention, detailed discussion of the elements in FIGURE 2 would be merely repetitious and will be omitted. Since these elements are identical with the elements described in FIGURE 1, the same numbers have been employed in FIGURE 2 for corresponding elements.

Various modifications within the scope of the present invention will occur to those skilled in the art. Thus, for example, various other liquid distribution means besides weirs may be employed to distribute liquid over the flow constriction baffles 5 and 6. Liquid feed nozzles could be employed for this purpose. In some cases, such nozzles might be even more advantageous than weirs, since extra flow velocity could thus be added to the downflowing scrubbing liquid. Further, the nozzles could be inclined from the vertical, so as to impart a horizontal component of flow direction to the downflowing liquid. In this case, the liquid would swirl down the surfaces of the baffles in a spiral path. This flow pattern might be highly advantageous in serving to fully eliminate the possibility of dry spots on the baffles and consequent buildup of deposited solids. Providing opposing spirals in the two flows of scrubbing liquid would also tend to promote greater coverage of the gas stream by the liquid stream when projected off the lips 7 and 8, and consequent more effective scrubbing action.

Thus, if nozzles are employed to disperse the scrubbing liquid stream 15 onto baffle 5, then a plurality of conduits such as 9 could serve as nozzles. In this case, referring to FIGURE 1, conduits 9 would terminate at the top of baffle 5. Enclosure 11 and weir 12 would be omitted, and instead the top of baffle 5 would be contiguous with the bottom of element 4, or else a horizontal unit could be provided to seal the opening between 5 and 4 against gas flow. Under such an arrangement, scrubbing liquid stream 15 would be directly dispersed from conduit 9 onto baffle 5 instead of first flowing through enclosure 11 and over weir 12. A similar arrangement could likewise be provided for dispersing scrubbing liquid stream 16 onto baffle 6.

In some instances, energy loss due to turbulence and pressure drop may be of minor importance. In such cases, the slopes of constriction baffles 5 and 6 may be sharply reduced or even eliminated, so as to create an orifice-like constriction of flow. In this way the apparatus could be further simplified, while still providing acceleration of gas flow velocity. This optional apparatus configuration is relatively less desirable, however, due to turbulence and the consequent possibility of solids buildup. Another objection would reside in the greater difficulty in providing uniform wetting and distribution of scrubbing liquid over the surfaces of baffles 5 and 6.

It is not intended that the invention be restricted to the preferred embodiment described and illustrated in FIGURES 1 and 2. However, this preferred embodiment represents the best mode of combining the apparatus elements into the unitary apparatus combination of the present invention. Other modifications within the scope of the present invention will occur to those skilled in the art.

We claim:

1. Apparatus for scrubbing solids from gas streams comprising a circular inlet duct, said duct extending vertically downward from a gas stream source to a lower terminus, a conical baffle coaxially aligned within said duct and spaced from the duct so as to define an annular passage, whereby the downflowing gas stream is directed into said annular passage, said conical baffle being provided with a substantially vertical downward extension at its lower end, a first coaxial circular baffle extending downward and sloping inward from adjacent the terminus of said duct and being provided with a substantially horizontal projection lip at its lower end, a second coaxial circular baffle spaced opposite to said first baffle, said second baffle extending downward and sloping outward from adjacent the lower end of said baffle extension, said second baffle also being provided with a substantially horizontal projection lip at its lower end, said projection lips being opposed and in the same plane, so as to define an annular venturi, and annular inlet means for flowing a scrubbing liquid onto said first and second circular baffles whereby said liquid passes downward and is projected substantially horizontally into the gas stream by said projection lips.

2. Apparatus of claim 1, in which said annular inlet means for flowing a scrubbing liquid onto said first and second circular baffles comprises first and second circular overflow weirs, said weirs being disposed at the upper extremities of said first and second circular baffles, together with means for flowing liquid over said weirs and onto said first and second circular baffles.

3. Apparatus of claim 1, in which a vertical annular flow passage extends downward from said lips, said annular flow passage being defined by a vertical inner wall and a vertical outer wall, followed by an inwardly sloping inner wall extending downward from said vertical inner wall and an outwardly sloping outer wall extending downward from said vertical outer wall.

References Cited in the file of this patent
UNITED STATES PATENTS

| | | |
|---|---|---|
| 1,163,753 | Hilleke | Dec. 14, 1915 |
| 2,394,293 | Deem | Feb. 5, 1946 |
| 2,530,002 | Coy | Nov. 14, 1950 |
| 2,545,028 | Haldeman | Mar. 13, 1951 |
| 2,604,185 | Johnstone et al. | July 22, 1952 |
| 2,621,754 | Doyle | Dec. 16, 1952 |
| 2,797,904 | Voorheis | July 2, 1957 |
| 2,890,870 | Spiselman | June 16, 1959 |